United States Patent [19]

Tabata et al.

[11] Patent Number: 4,485,293
[45] Date of Patent: Nov. 27, 1984

[54] SHORT CIRCUIT TRANSFER ARC WELDING MACHINE

[75] Inventors: Youichiro Tabata; Shigeo Ueguri, both of Hyogo; Takaji Mizuno; Hirohisa Segawa, both of Aichi; Seigo Hiramoto, Hyogo, all of Japan

[73] Assignee: Mitsubishi Denki Kabushiki Kaisha, Tokyo, Japan

[21] Appl. No.: 366,614

[22] Filed: Apr. 8, 1982

[30] Foreign Application Priority Data

| Apr. 10, 1981 [JP] | Japan | 56-53933 |
| Apr. 10, 1981 [JP] | Japan | 56-53935 |
| Apr. 10, 1981 [JP] | Japan | 56-53936 |
| Apr. 10, 1981 [JP] | Japan | 56-53938 |
| Aug. 31, 1981 [JP] | Japan | 56-13664 |

[51] Int. Cl.³ .................................... B23K 9/09
[52] U.S. Cl. ...................... 219/130.31; 219/130.33; 219/130.51; 219/137 PS
[58] Field of Search ............ 219/130.21, 130.31, 219/130.32, 130.33, 130.51, 130.5, 137 PS

[56] References Cited

U.S. PATENT DOCUMENTS

| 3,349,219 | 10/1967 | Ramsey ................ | 219/130.51 |
| 3,792,225 | 2/1974 | Needham et al. ...... | 219/130.21 |
| 3,809,853 | 5/1974 | Manz .................... | 219/130.21 |
| 4,000,374 | 12/1976 | DeKeyser ............. | 219/130.33 |
| 4,300,035 | 11/1981 | Johansson ............ | 219/130.21 |
| 4,301,355 | 11/1981 | Kimbrough et al. .. | 219/130.33 |

FOREIGN PATENT DOCUMENTS 55-97875  7/1980  Japan ........................... 219/130.33

*Primary Examiner*—C. C. Shaw
*Attorney, Agent, or Firm*—Sughrue, Mion, Zinn, Macpeak & Seas

[57] ABSTRACT

A short circuit transfer arc welding machine including a wire electrode which is fed towards a base metal, a DC source for applying a voltage across the base metal and the wire electrode, a switching element for interrupting the voltage, a voltage detector for detecting a voltage developed across the base metal and the wire electrode, a first comparator for determining when a detection voltage outputted by the voltage detector reaches a voltage value corresponding to the short circuiting of the base metal and wire electrode, a second comparator for determining when the detection voltage of said voltage detector reaches an arc discharge voltage, and a switching element control circuit for closing the switching element in response to a signal from the first comparator and for opening the switching element in response to a signal from the second comparator.

20 Claims, 31 Drawing Figures

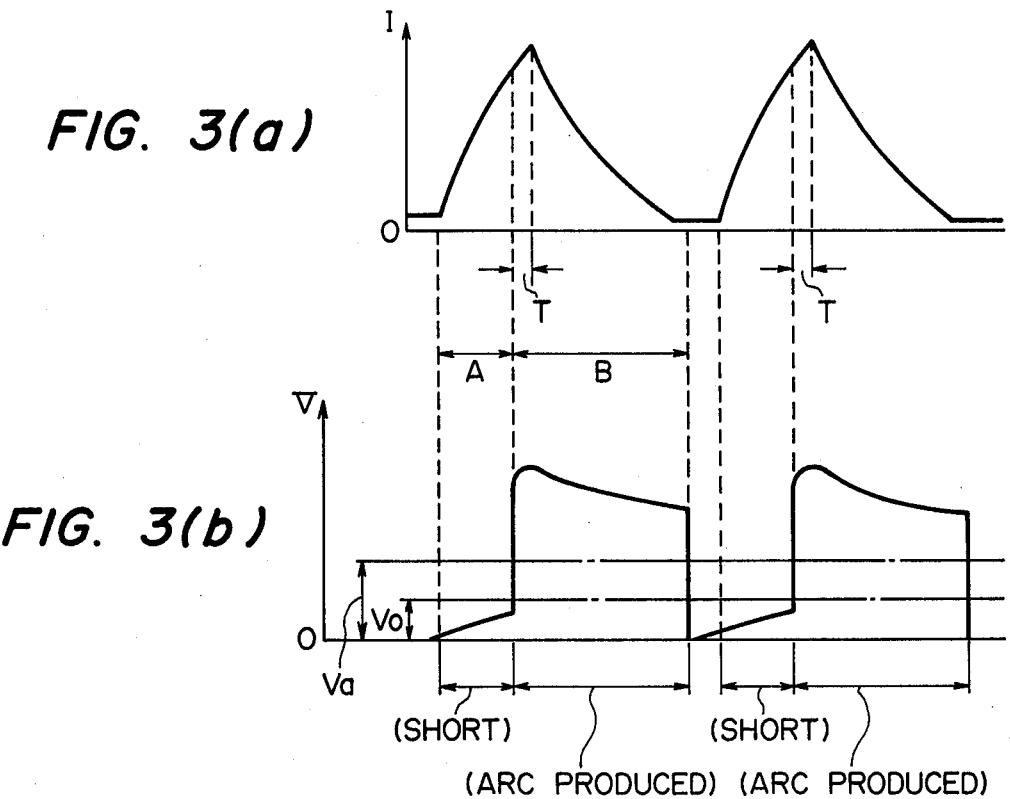
FIG. 3(a)
FIG. 3(b)
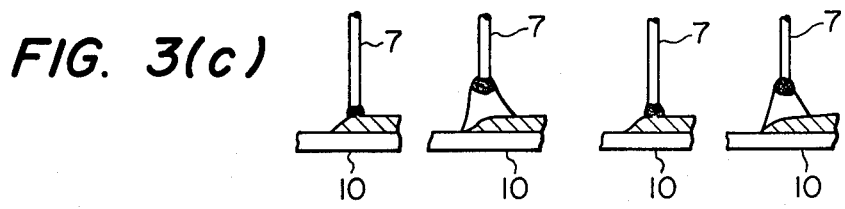
FIG. 3(c)

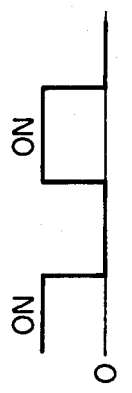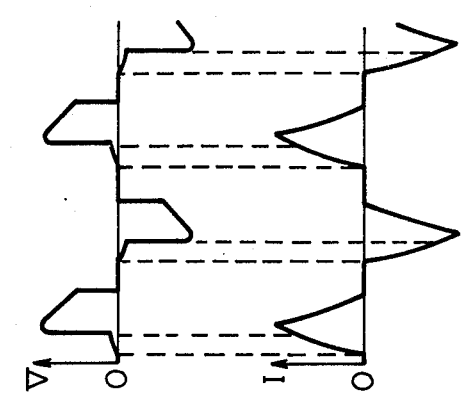
FIG. 6(a)  FIG. 6(b)  FIG. 6(c)  FIG. 6(d)
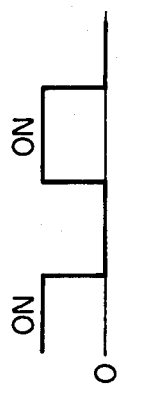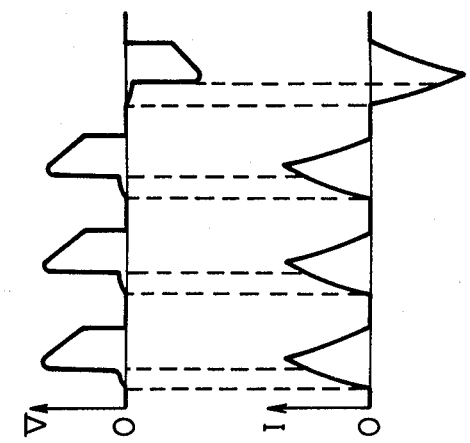
FIG. 5(a)  FIG. 5(b)  FIG. 5(c)  FIG. 5(d)

FIG. 7(c)

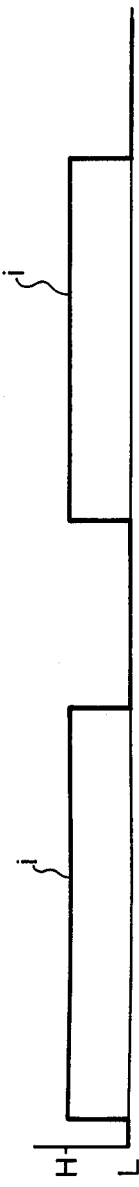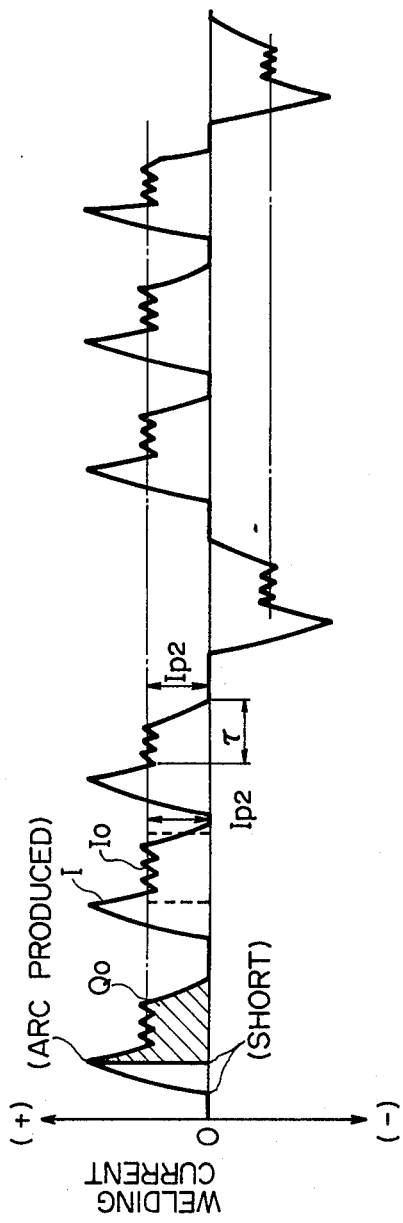

SHORT CIRCUIT TRANSFER ARC WELDING MACHINE

BACKGROUND OF THE INVENTION

This invention relates to short circuit transfer arc welding machines.

A conventional short circuit transfer arc welding machine is as shown in FIG. 1. In FIG. 1, reference numeral 1 designates a DC source circuit for converting alternating current into direct current; 13, a pulse waveform setting circuit for outputting a pulse current value instruction signal a; 14, a pulse period setting circuit for providing a pulse current which receives signals a and b from the setting circuits 13 and 14, to control the "on-off" period of a switching element 2 such as a transistor; 3, a DC reactor; 4, a flywheel diode for preventing the application of a reverse voltage (high voltage) due to the DC reactor 3 immediately after the switching element 2 is turned off; 5, an auxiliary power source for supplying a DC current (hereinafter referred to as a base current, when applicable) to maintain a welding arc; 6, a reel on which a welding wire 7 has been wound; a wire feeding motor for feeding the wire 7 towards a material to be welded, namely, a base metal 10; 9, a welding torch which the wire 7 penetrates; and 11, a welding current detector comprising a shunt resistor, etc. The output of the welding current detector 11 is applied to the switching instruction circuit 12, where it is compared with the pulse current value instruction signal a, so that the "on-off" timing of the switching element 2 is controlled to obtain a pulse current having a predetermined value.

The short circuit transfer welding operation of the welding machine thus constructed will now be described.

First, the pulse current period instruction signal b and the pulse current value instruction signal a which are selected with respect to a selected wire feeding speed are applied to the switch instruction circuit 12. As a result, the "on-off" instruction signal is applied to the switching element 2 by the switching instruction circuit 12, so that a pulse current having a constant value flows with a constant pulse period.

Thereafter, the wire electrode 7 is fed to the welding torch 9 from the reel 6, and the end 7a of the wire electrode 7 is brought into contact with the base metal 10. By the first pulse current, the end 7a of the wire electrode 7 is burnt off and an arc is produced between the wire electrode and the base metal, so that the end 7a of the wire electrode 7 and the base metal 10 are heated and made molten by the arc thus produced. At the same time, the welding wire 7 is fed so that the molten wire electrode 7 is pushed against the base metal 10. The wire electrode thus shorted with the base metal is burnt off by the next pulse current, so that an arc is produced again. The above-described operation is repeatedly carried out for welding.

In the above-described welding device, the wire electrode feeding speed is not associated with the period of generation of the pulse current; that is, the wire electrode feeding speed and the pulse current generating period are set separately. Therefore, sometimes the timing of pushing the molten wire end 7a against the base metal 10 is not synchronous with the timing of the application of the pulse current. If this occurs, the wire electrode 7 is caused to push the base metal for a relatively long period of time, as a result of which a large quantity of large sputters are scattered to stick to the base metal 10 or the components of the welding machine. The conventional welding machine is obviously disadvantageous for this reason.

SUMMARY OF THE INVENTION

Accordingly, a first object of this invention is to provide a short circuit transfer arc welding machine in which sputters are scarcely produced and wherein the resultant weld is of fine quality.

A second object of the invention is to provide a short circuit transfer arc welding machine in which the variation of an average arc length due to vibration is lowered with the welding current changed over the entire range, to achieve stable welding conditions.

In order to achieve the foregoing objects, in the invention, a sensor for detecting a voltage developed across the base metal and the wire electrode is provided, and a switching element is controlled so that the application of current is started when a voltage detected by the sensor reaches a value corresponding to short-circuiting and is ended when the voltage reaches a value corresponding to arc reproduction.

A third object of the invention is to provide a short circuit transfer arc welding machine in which the amount of penetration and the amount of reinforcement can be changed in agreement with the configuration of the base metal.

A fourth object of the invention is to provide a short circuit transfer arc welding machine in which the welding conditions are optimized by automatically adjusting the current in an arcing period according to the wire feeding speed.

A fifth object of the invention is to provide a short circuit transfer arc welding machine in which the current in an arcing period is automatically adjusted to set an average welding voltage to a predetermined value, and in which irregularity in the respective period of short-circuiting and arcing due to vibration or the like is eliminated.

A sixth object of the invention is to provide a short circuit transfer arc welding machine in which the welding conditions can be readily set, and where the resultant weld is free from defects, such as undercuts, for instance.

The nature, priciple and utility of the invention will become more apparent from the following detailed description and the appended claims when read in conjunction with the accompanying drawings.

BRIEF DESCRIPTION OF THE DRAWINGS

In the accompanying drawings:

FIGS. 3(a) and 3(b) are time charts showing a current waveform and a voltage wave form of the first embodiment of FIG. 2;

FIG. 3(c) is an explanatory diagram showing different welding states:

FIGS. 5(a), 6(a) and 7(a); FIGS. 5(b), 6(b) and 7(b); FIGS. 5(c), 6(c) and 7(c); and FIGS. 5(d), 6(d) and 7(d) are signal i switching timing charts, voltage waveform diagrams, current waveform diagrams and sectional views of beads formed in the second embodiment of the invention, respectively;

FIGS. 9(a) and 9(b) are a signal i switching timing chart and the current waveform diagram for the third embodiment of the invention, respectively;

DETAILED DESCRIPTION OF THE PREFERRED EMBODIMENTS

Figure 1:
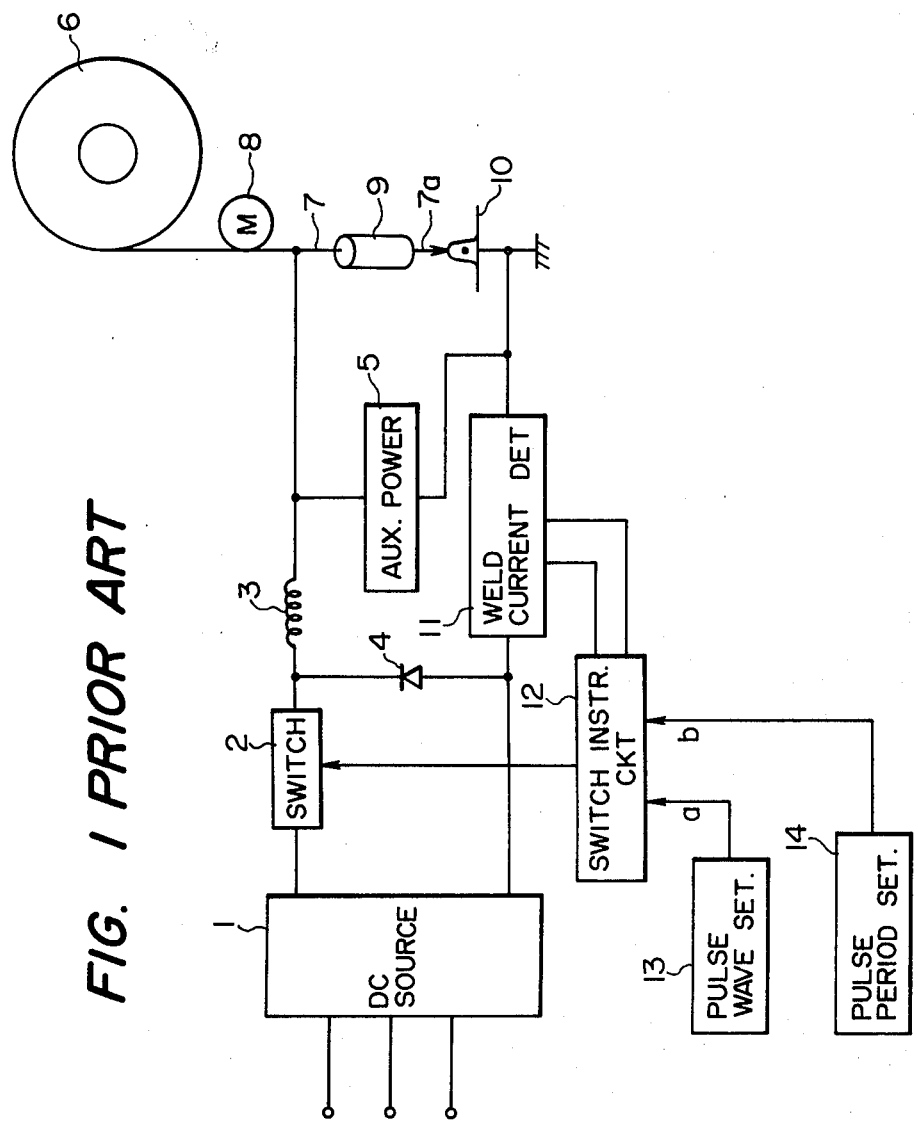
FIG. 1 is an explanatory diagram showing the arrangement of a conventional short circuit transfer arc welding machine.
Figure 2:
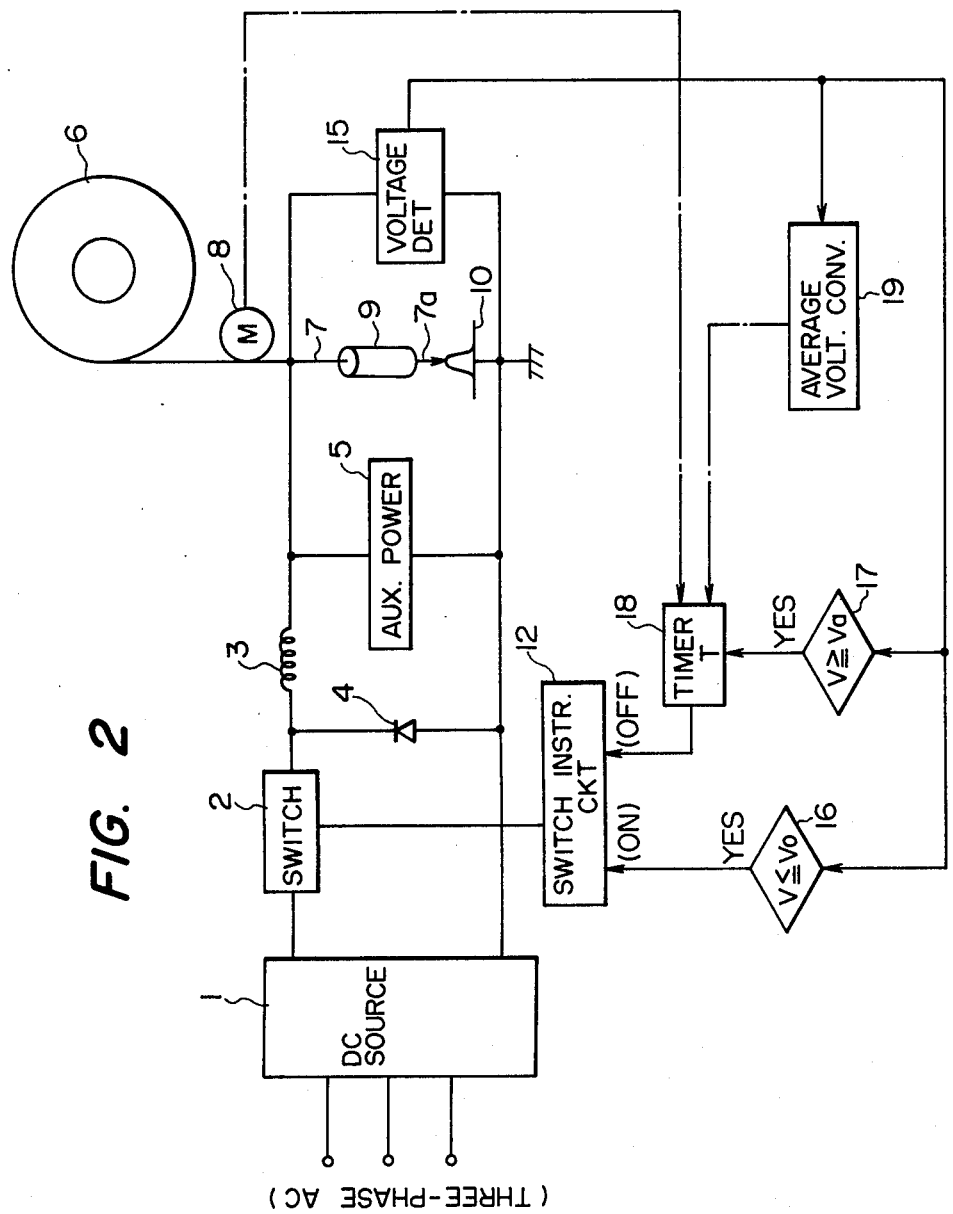
FIG. 2 is an explanatory diagram showing the arrangement of a first embodiment of this invention.

In FIG. 2, reference numeral 15 designates a voltage detector for detecting the voltage across the wire electrode 7 and the base metal 10; and 16, first comparator in which a voltage V detected by the voltage detector 15 is compared with voltage Vo corresponding to short circuiting (which is the voltage when short circuiting occurs or immediately before short circuiting occurs). When $V \leq Vo$, the comparator 16 issues an instruction signal to a switch instruction circuit 12 so that a switching element 2 is turned on. In other words, the comparator 16 operates to determine the occurrence of short circuiting between the wire electrode 7 and the base metal 10.

In a second comparator 17, the voltage V detected by the voltage detector 15 is compared with a voltage Va corresponding to the production of an arc. When $V \geq Va$, the comparator 17 operates a timer 18 (when necessary) so that an instruction signal for turning off the switching element 2 is issued to the switching instruction circuit after a predetermined period of time T. In other words, the comparator 17 operates to determine when arcing occurs. The period of time set by the timer 18 may be zero. Parts (a) and (b) of FIG. 3 are waveform diagrams showing the current and voltage in the welding machine thus arranged, respectively. FIG. 3(c) is a diagram showing various welding phenomena.

Now, the operation of the welding machine described above will be described.

First, under the conditions that the input switches (not shown) of the DC source circuit 11 and the auxiliary power source 5 for applying a low voltage are turned on, the end 7a of the wire electrode 7 is caused to contact the base metal 10. In this case, the voltage V detected by the voltage detector 15 is lower than the voltage Vo corresponding to short circuiting ($V \leq Vo$). Therefore, the "on" instruction signal is applied to the switch instruction circuit 12. As a result, the switch instruction circuit 12 provides a trigger signal to close the switching element 2, so that the DC source circuit 1 applies current to the wire electrode 7 and the base metal 10. The current flows continuously until the wire electrode 7 is burnt off, i.e., arcs are generated. Therefore, the detecting voltage V of the voltage detector 15 is raised to an arcing voltage from a short circuiting voltage, whereupon the operation of the first comparator 16 is suspended. Soon the detection voltage V becomes higher than the voltage Va corresponding to the production of the arc ($V \geq Va$). Therefore, the second comparator 17 is operated, and the timer 18 is also operated. Accordingly, an "off" instruction signal is applied to the switch instruction circuit 12 with a predetermined delay time T, so that the application of the trigger signal by the switch instruction circuit 12 is suspended, so that the switching element 2 is opened. Accordingly, the current is damped by the reactor 3, and only the current from the auxiliary power source 5 flows.

As described above, in the first arcing period B, the wire electrode 7 and the base metal 10 are heated and melted while the wire electrode 7 is fed to the torch 9 by the wire feeding motor 8. Therefore, the molten end 7a of the wire 7 is brought into contact with the base material, and the switching element 2 is closed again, so that the current is applied to the wire and base metal from the DC source circuit. Thus, the molten material of the wire electrode is transferred to the base metal. When the above-described operation is carried out repeatedly, a welding voltage waveform and a welding current waveform which is substantially triangular are obtained as shown in parts (b) and (a) of FIG. 3, respectively. Thus, the welding condition is stably maintained.

The following method may likewise be employed for the welding machine. The predetermined period of time T set by the time 18 may be controlled according to the speed of the wire feeding motor 8, the detection voltage V of the voltage detector 15 subjected to conversion in an average voltage converter 19, and the output of the converter 19 fed back to the timer 18, so that the delay time T may be adjusted to an optimum value. In this case, variations in the average arc length due to vibrations are reduced over the entire range of welding currents, and therefore the welding operation may be made more stable.

The above-described welding machine of the invention in which a voltage is applied across the base metal and the wire electrode fed towards the base metal, so that welding is carried out by repeated short-circuiting and arcing between the base metal and the wire electrode, essentially includes the voltage detector for detecting the voltage across the base material and the wire electrode; means for beginning application of the pulse current between the wire electrode and the base metal when the detection voltage of the voltage detector becomes a value corresponding to the occurrence of a short circuit; and means for lowering the applied current when the voltage detector detects an arc discharge reproduction voltage, or at a predetermined delay time after this detection. In the welding machine, during the short circuit transfer, the amount of sputter produced is very small, and the sputters are very small in size. Therefore, the sputters never stick to the base metal, and work efficiency is considerably improved.

In the first embodiment described above, a reverse polarity connection is employed; that is, the wire electrode 7 is employed as the anode, and the base metal 10 as the cathode. In this case, a large amount of heat is applied to the base metal 10. In welding a thin plate, the amount of heat applied to the base metal may be so large that the base metal is melted off. The forward polarity connection may be employed; that is, the wire electrode 7 and the base material 10 may be employed as the cathode and the anode, respectively. However, in this case, the wire electrode 7 is more greatly melted, as a result of which the beads formed are convex. A method in which a sinusoidal alternating current is employed for welding is known in the art. However, in this method, the repetition of welding phenomena, i.e., short circuiting and arcing, are not synchronous with an applied voltage waveform. Therefore, in this method, it is necessary to use a coated electrode to facilitate arc production.

Figure 4:
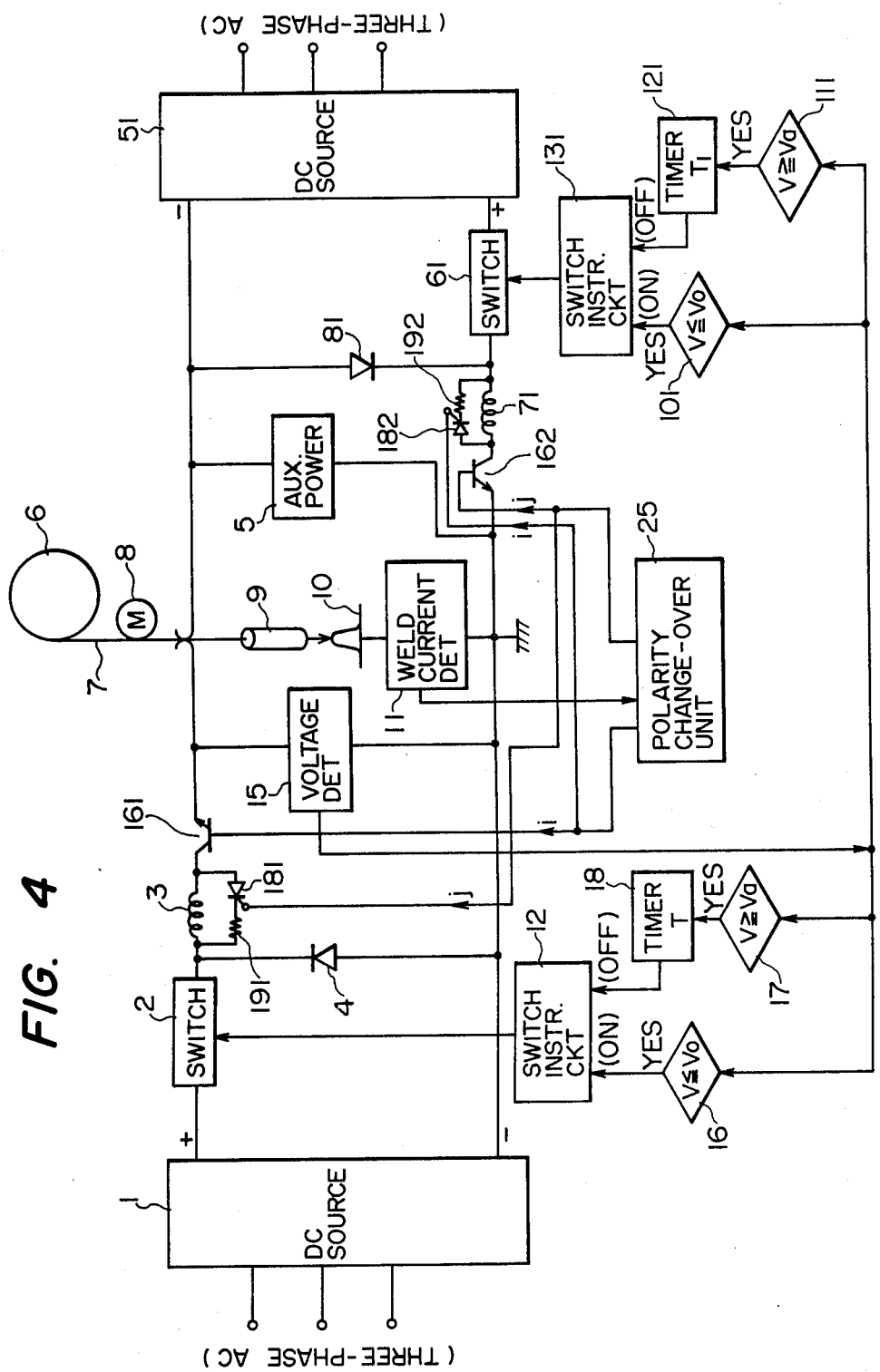
FIG. 4 is an explanatory diagram showing the arrangement of a second embodiment of the invention.

FIG. 4 shows a second embodiment of the invention in which the above-described drawbacks have beem eliminated. In the second embodiment, the amount of penetration and the amount of reinforcement can be varied, as desired, over a wide range according to the configuration of the base metal.

In FIG. 4, reference numeral 51 designates a DC source circuit in which a three-phase alternating current is rectified; 61, a switching element such as a transistor for intermittently transmitting the output of the DC source circuit 51; 71, a reactor; 81, a flywheel diode for circulating the energy which is stored in the reactor 71 immediately after the switching element 61 is turned off; 101 and 111, third and fourth comparators in which an arc voltage detected by a voltage detector 15 is compared with predetermined voltages, respectively; 121, a timer for delaying the output signal of the comparator 111 for a predetermined period $T_1$; and 131, a switch instruction circuit which receives an "on" instruction from the comparator 101 and an "off" instruction from the timer 121 to turn the switching element 61 on and off.

Further in FIG. 4, reference numeral 11 designates a detector for detecting a welding current; 161 and 162, switching elements for turning currents from DC source circuit 1 and DC source circuit 51 on and off, respectively; 25, a polarity change-over unit for selectively switching on the element 161 or the element 162; 181 and 182, switching elements such as thyristors; and 191 and 192, resistors.

In FIG. 4, parts identical with those of FIG. 2 are designated by like reference numerals or characters.

The operation of the welding machine thus organized will now be described.

Figure 7A:
Figure 7B:
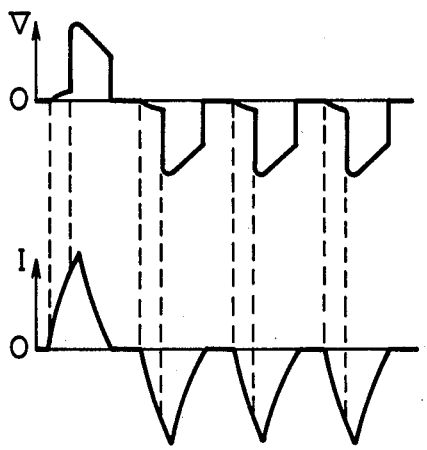
Figure 7D:
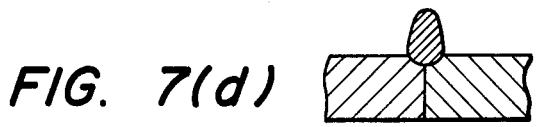

The operation of the DC source circuit 51, the switching circuit 61, the reactor 71, the flywheel diode 81, the comparators 101 and 111, the timer 121 and the switch instruction circuit 131 are similar to those of the DC source circuit 1, switching circuit 2, reactor 3, flywheel diode 4, comparators 16 and 17, timer 18 and switch instruction circuit 12 of FIG. 2 described above. The polarity change-over unit 25 is provided in order that the forward polarity connection and the reverse polarity connection may be suitably switched to control the configuration of the bead (the amount of penetration and the amount of reinforcement). During the forward polarity connection, a trigger signal j is applied to the switching element 162 so that the latter is rendered conductive, while no trigger signal i is applied to the switching element 161 so that the latter is maintained non-conductive. In contrast, during the reverse polarity connection, the switching element 161 is rendered conductive, while the switching element 162 is rendered nonconductive. In switching polarities, the signal i and the signal j are applied to the gate terminals of the switching elements 181 and 182, in order to absorb the surge voltages which are developed when the currents remain in the reactors 3 and 71, respectively. In switching the forward polarity connection over to the reverse polarity connection, the switching element 182 is rendered conductive, so that the energy in the reactor 71 is consumed by the resistor 192. In switching the reverse polarity connection over to the forward polarity connection, the switching element 181 is rendered conductive, so that the energy in the reactor 3 is consumed by the resistor 191. In the case of the forward polarity connection, the amount of heat applied to the base metal is lower, but the amount of reinforcement is greater. In contrast, in the case of the reverse polarity connection, the amount of heat applied to the base metal is larger, but the amount of reinforcement is lower. Therefore, in order to form a bead, depending on the thickness and configuration of base metals and the gap therebetween, the ratio of the forward polarity connection to the reverse connection in the welding period should be changed as required by suitably applying the signal i as shown in FIG. 5(a), FIG. 6(a) and FIG. 7(a) (the signal j being applied in a manner completely opposite to the signal i). In this case, the voltage waveforms (with the potential of the base metal being zero) are as shown in part (b) of FIGS. 5, 6 and 7, and the current waveforms (being positive in the case of the reverse polarity connection) are as shown in part (c) of these figures, respectively. As is apparent from part (d) of FIGS. 5, 6 and 7, as the percentage of the reverse polarity connection decreases, the configuration of the bead in section is changed. In both the forward and reverse polarity connections, upon an inversion of polarity the rise of the pulse current is synchronized with the short circuiting of the wire electrode and the base metal without fail, and the current required for arc reproduction is thus obtained at this time. Accordingly, short circuiting is smoothly shifted to arcing in a short time. If the circuitry is designed so that the welding current comes to zero by the occurrence of the next instance of short circuiting and the detector 11 detects the zero welding current, so that thereafter the polarity change-over unit 25 may be operated positively, it is unnecessary for the switching elements 161 and 162 to directly turn off large currents, and accordingly the surge voltage suppressing circuits comprising the thyristors 181 and 182 and the resistors 191 and 192 can be eliminated.

The operator selects the ratio of forward and reverse polarity connections in the welding period in advance, as described above. For instance in the case where welding should be performed with the amount of penetration of the base metal increased, the percentage of the reverse polarity connection is made larger. In contrast, in the case of a weld bead requiring an increase in the amount of reinforcement, the percentage of the forward polarity connection is made larger.

The welding machine according to the second embodiment of the invention is designed so that the ratio of the forward and reverse polarity connection can be changed as required, as described above. Therefore, the configuration of the bead can be obtained stably and as required according to the thickness and configuration of the base metals.

Figure 8:
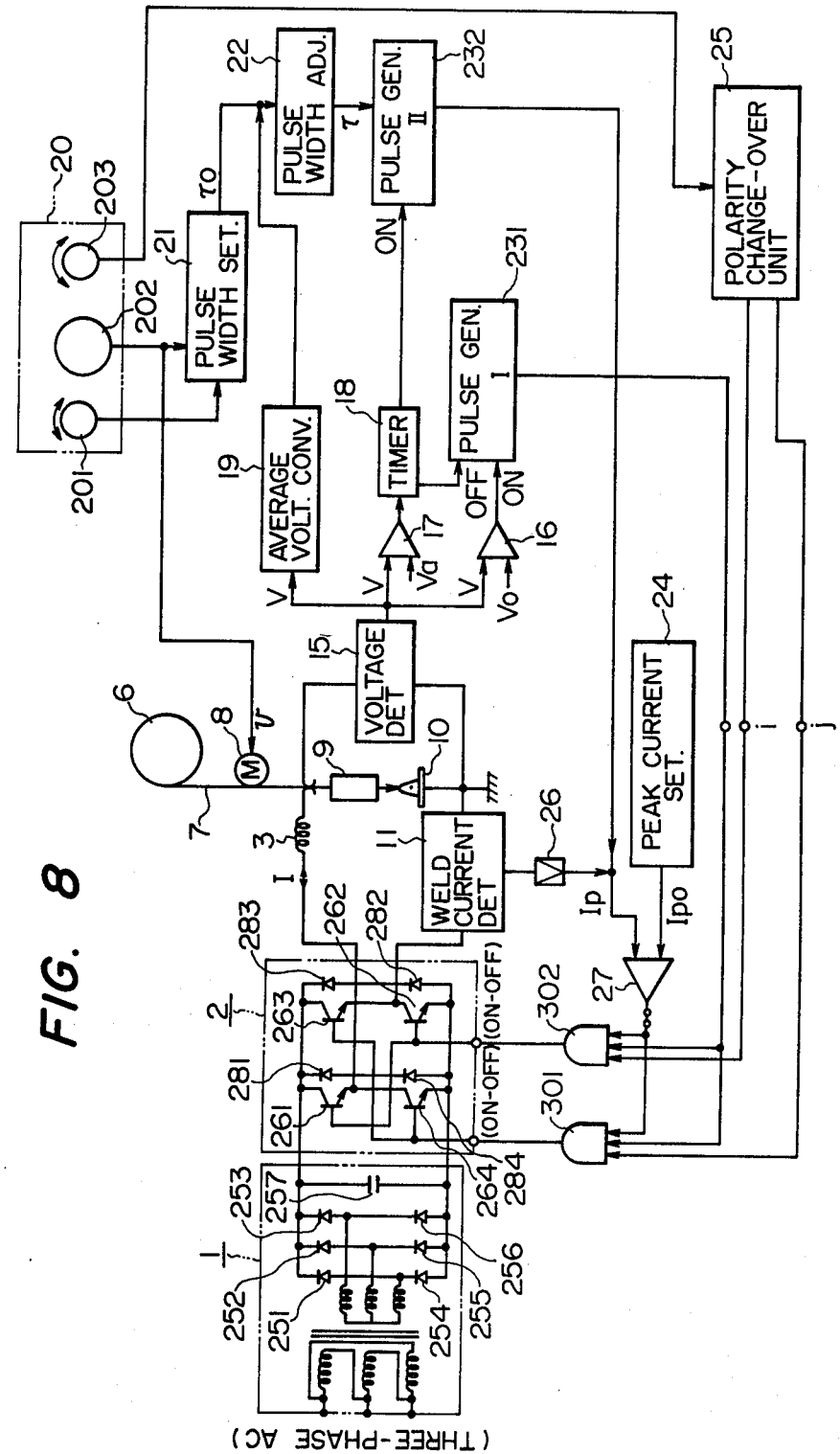
FIG. 8 is an explanatory diagram showing the arrangement of a third embodiment of the invention.

FIG. 8 shows a third embodiment of the invention, which has a polarity change-over mechanism similar to that of FIG. 4.

In FIG. 8, reference numeral 2 designates a switching circuit comprising an inverter circuit made up of power transistors 261 through 264; 20, an operation box including an arc length setting dial 201, a wire feed data setting dial 202 and a polarity ratio setting dial 203; 21, a pulse width setting circuit; 22, a pulse width adjusting circuit for correcting the output voltage signal $\tau_0$ of the pulse width setting circuit 21 with the aid of the output voltage signal of an average voltage converter 19, to provide an output voltage signal $\tau$; 231 and 232, pulse generating circuits I and II, respectively; 24, a peak current setting circuit for setting a peak current $I_{P0}$ during an arcing period; 11, an arc current detector; 26, an amplifier for amplifying the output of the arc current detector 11; and 27, a comparator in which the output $I_P$ of the amplifier 26 is compared with the output signal $I_{P0}$ of the peak current setting circuit 24. The comparator 27 provides an "L" level signal when $I_P \geq I_{P0}$ and an "H" level signal when $I_P \leq I_{P0}$.

Further in FIG. 8, reference numerals 301 and 302 designate AND circuits to which the output signal of the comparator 27, the output signal of a pulse generating circuit 231 and the output signals i and j of a polarity change-over unit 25 are applied as shown in FIG. 8. The output signal of the AND circuit 301 is applied to the bases of the power transistors 263 and 264 in the inverse circuit 2, while the output signal of the AND circuit 302 is applied to the bases of the power transistors 261 and 262 in the inverter circuit 2.

FIG. 9(a) shows the waveform of the output signal i of the polarity change-over unit 25 of FIG. 8, and FIG. 9(b) shows the waveform of the arc current in the welding machine according to the third embodiment of the invention. The waveform of the output signal j of the polarity change-over unit is obtained by inverting the waveform of the output signal i. In part (b) of FIG. 9, reference character $Q_0$ indicates an optimum amount of charge in an arcing period, and $I_0$ (indicated by the broken line) indicates the waveform of a predetermined reference pulse current for obtaining the optimum amount of charge $Q_0$.

Now, the operation of the circuitry shown in FIG. 8 will be described.

The output of the DC source circuit 1 is applied to the inverter circuit 2, in which the pulse current width in an arcing period, the short-circuiting current and the polarity of a welding arc are controlled for forward or reverse polarity operation.

In operating the welding machine, first the arc length setting dial 201, the wire feed data setting dial 202 and the polarity ratio setting dial 203 are set to predetermined values. The pulse width setting circuit 21 applies a reference pulse width signal $\tau_0$ according to the combination of the arc length and wire feed data thus set, to the pulse width adjusting circuit 22. At the same time, the average voltage converter 19 applies an average welding voltage signal to the pulse width adjusting circuit 22, so that the reference pulse width signal $\tau_0$ is corrected into a pulse width signal $\tau$ which is applied to the pulse generating circuit II 232.

The reason why the reference pulse width signal $\tau_0$ is corrected according to the average voltage signal is to prevent variations in the arc length due to the vibration of the torch 9. If the arc length is increased by the vibration, the average voltage signal is increased, and therefore this signal is utilized to make the arc length slightly shorter than the reference pulse width $\tau_0$, whereby the arc length is returned to the original value. In contrast, when the arc length becomes shorter, it is corrected to be slightly longer than the reference pulse width $\tau_0$.

The output signal of the wire feed data setting dial 202 is applied to a motor 8 so that the wire is fed at a predetermined wire feeding speed v.

The output V of the voltage detector 15 is compared with a voltage Vo corresponding to short circuiting in a first comparator 16, and is compared with a voltage Va corresponding to an arc voltage in a second comparator 17. When $V \leq Vo$, the comparator 16 provides an "H" level signal. When $V \geq Va$, the comparator 17 provides an "H" level signal which is applied to a delay circuit 18 including a timer. In the delay circuit 18, a time delay T is provided between the input and output. The output of the delay circuit 18 is applied, as an "L" level signal, to the pulse generating circuit I 231 and is applied, as an "H" level signal, to the pulse generating circuit II 232.

Thus, the output of the pulse generating circuit I 231 is raised to the "H" level by the comparator 16 when $V \leq Vo$ and is set to the "L" level by the comparator 17 when $V \geq Va$, this output being applied to the AND circuits 301 and 302. On the other hand, the output of the pulse generating circuit II 232 is set to the "L" level when the output signal of the delay circuit 18 is raised to the "H" level. When the output signal is raised to the "H" level as described above, an integration circuit in the pulse generating circuit II 232 is operated, so that when the output voltage of the integration circuit becomes equal to the output voltage signal $\tau$ of the pulse width adjusting circuit 22 (i.e., $\tau$ msec after the output signal of the delay circuit 18 is raised to the "H" level) the output signal level of the pulse generating circuit II 232 is changed to the "H" level.

Therefore, during the period of $\tau$ msec after the output signal of the delay circuit 18 has been raised to the "H" level, the comparator 27 compares a detected peak current $I_P$ with the output signal $I_{P0}$ of the peak current setting circuit 24, thus providing an "H" level signal when $I_{P0} > I_P$ and an "L" level signal when $I_{P0} \leq I_P$. During the remaining period, the output of the comparator 27 is maintained at the "L" level because the "H" level signal of the pulse generating circuit II 232 is applied to the comparator 27.

When the operator sets the polarity ratio setting dial 203 to an optimum value according to the welding conditions such as the configuration and thickness of the base metals, the polarity change-over unit 25 outputs the signals i and j whose levels are alternately set to the "H" and "L" levels according to the ratio of the forward and reverse polarity connections as set by the connection percentage setting dial 203.

The output signal of the comparator 27, the output signal of the pulse generating circuit I 231 and the output signals i and j are applied to the AND circuits 301 and 302 as shown in FIG. 8. Only when these input signals are at the "H" level do the AND circuits 301 and 302 provide output signals which drive the transistors 261 through 264 in the inverter circuit 2. The "on" and "off" timing of the transistors 261 and 262 and that of the transistors 263 and 264 are changed by the output signals of the AND circuits 301 and 302, respectively, so that the current application ratio of the forward and reverse polarity connections comes to the set value.

Since the polarity ratio can be controlled by one action as described above, the amount of penetration and the amount of reinforcement can be changed as desired over a wide range in agreement with the configuration of the base metals. Furthermore, as the pulse width signal is corrected according to the welding voltage average value, welding can be carried out with a stable arc length at all times.

The current application periods in the forward and reverse polarity modes are set by the polarity ratio setting dial 203 on the control box 20; however, the setting can be most simply achieved by setting a time ratio of the forward to the reverse polarity connection. Furthermore, the polarity change-over unit 25 may be desired so that the number of instances of short circuiting between the wire electrode 7 and the base metal 10 in one of the forward and reverse polarity modes is counted with a counter, where when the count value of the counter reaches a predetermined value, the polarity connection is changed. In addition, the polarity connections may be switched according to a method in which the percentage of the amounts of charges in the arcing periods of the forward and reverse polarity connections are set and calculated. Moreover, a setting may be achieved with the setting dial 203 so that welding is carried out in the reverse polarity mode only when welding is started or ended.

In the welding machine of FIG. 2, the predetermined time T set by the timer 18 is controlled according to the operation of the wire feeding motor 8; the detection voltage V of the voltage detector 15 is subjected to conversion in the average voltage converter 19, and the output of the latter is fed back to the timer 18, so that the delay time T is adjusted to an optimum value. This is for controlling the current in the arcing period, to thereby facilitate the setting of the welding conditions and increase the welding work efficiency.

Figure 10:
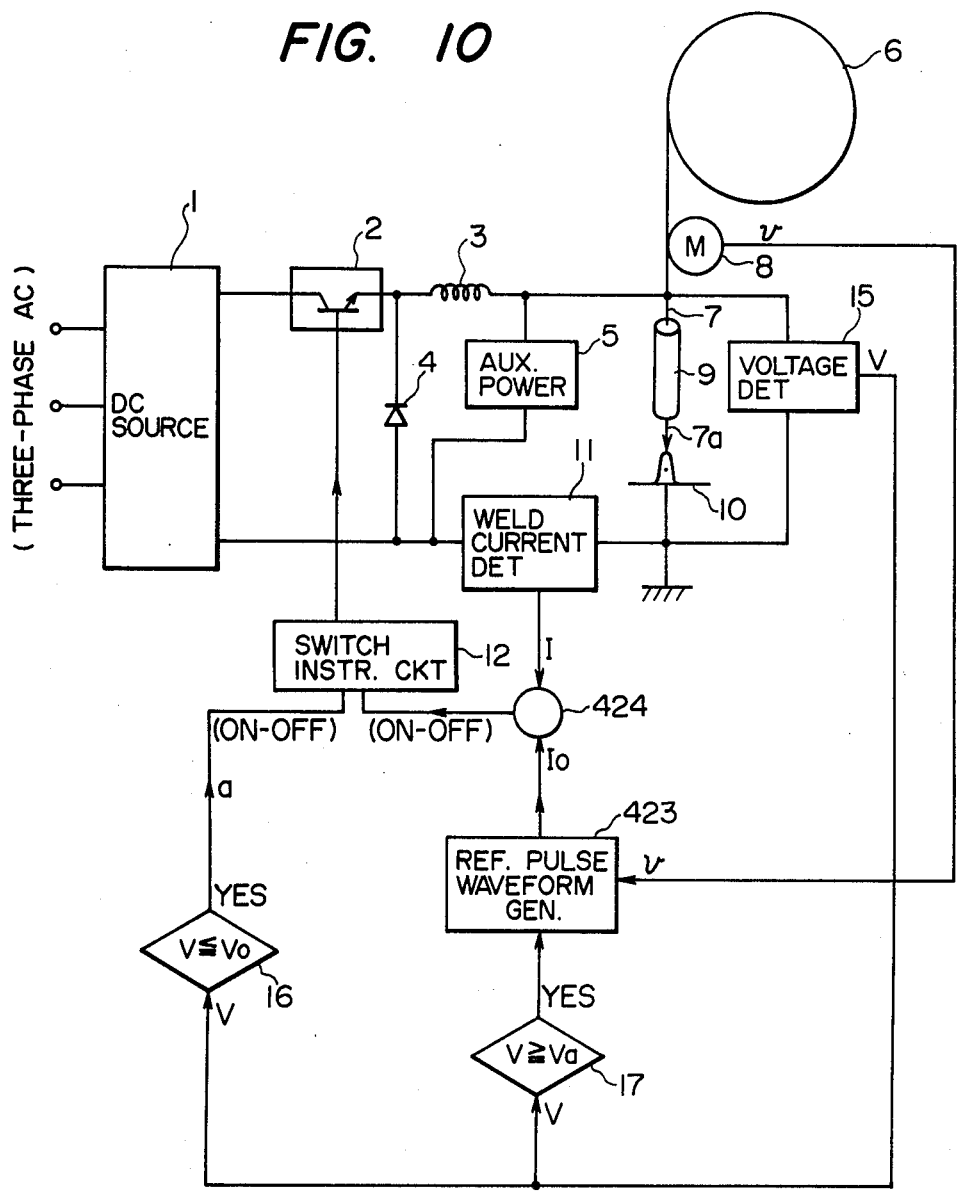
FIG. 10 is an explanatory diagram showing the arrangement of a fourth embodiment of the invention.

A fourth embodiment of the invention in which the aforementioned arcing period current is automatically controlled will be described with reference to FIG. 10. In FIGS. 2 and 10, like parts are designated by like reference numerals.

In FIG. 10, reference numeral 11 designates a current detector; 423, a reference pulse waveform generator in which a reference pulse waveform $I_0$ is selected according to the wire feed data of the wire feeding motor 8 and whose operation time is controlled by the second comparator 17; and 424, a third comparator which compares the detection current I of the current detector 11 with the reference pulse current waveform, and applies an "on-off" instruction signal to the switch instruction circuit 12 according to the comparison result.

Figure 11A:
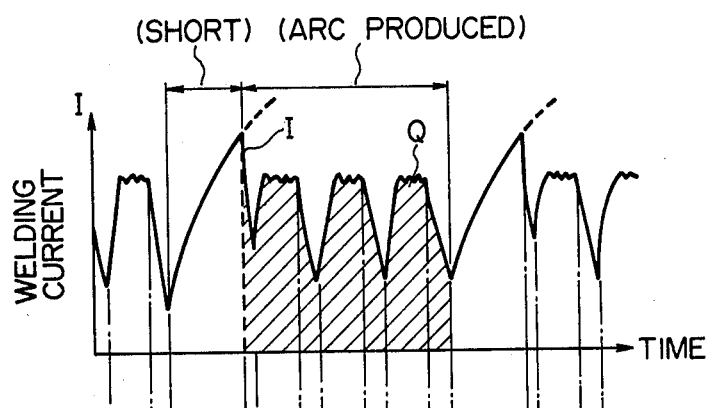
FIGS. 11(a), 11(b) and 11(c) are diagrams showing the welding current waveform, the reference pulse current waveform, and the signal a of FIG. 10 for the fourth embodiment.
Figure 11B:
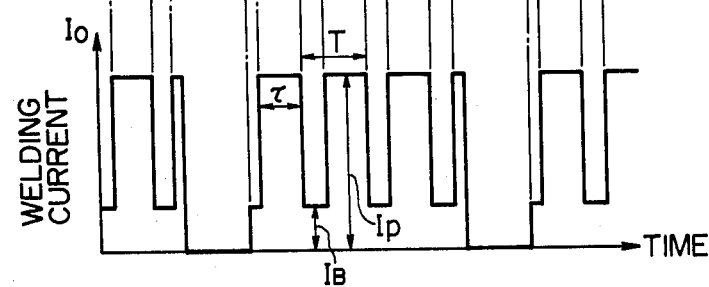
Figure 11C:
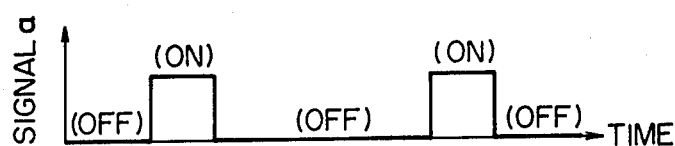

FIG. 11(a) is a diagram showing the waveform of the welding current in the welding machine of FIG. 10, FIG. 11(b) is a waveform diagram showing the reference pulse current waveform $I_0$, and FIG. 11(c) is a time chart showing the output signal a of the first comparator 16.

The operation of the welding machine of FIG. 10 will now be described.

While the input switch of the DC source circuit 1 is turned on, the wire 7 is fed to the torch 9 by the wire feeding motor 8. Then, the wire electrode 7a is short-circuited with the base metal 10. Accordingly, the first comparator, receiving the detection voltage V of the voltage detector 15, is operated, and the signal a is placed in the ON state. Therefore, the ON instruction is applied through the switch instruction circuit 12 to the switching element 2, and a short circuiting current is supplied to the torch side from the DC source circuit 1. The end of the wire electrode 7a is burnt off by this current, so that the short-circuiting condition is eliminated and an arc is produced. Upon production of the arc, the detection voltage V of the voltage detector 15 is increased, and the signal a of the first comparator 16 is placed in the "OFF" state. Then, the second comparator 17 is operated, so that its output is placed in the "ON" state. Therefore, the reference pulse waveform generator 423 is operated, so that reference pulse current waveform $I_0$ corresponding to the wire feeding speed v is outputted. The reference pulse current waveform $I_0$ and a current value (I) signal detected by the current detector 15 are applied to the third comparator 424. When $(I_0-I)$ is positive, the comparator 424 applies the "ON" instruction signal through the switch instruction circuit 12 to the switching element 2. When $(I_0-I)$ is negative, the comparator 424 applies the "OFF" instruction signal through the switch instruction circuit 12 to the switching element 2. By this current feedback control during the arcing period, the current waveform, i.e., the amount of charge Q (corresponding to the shaded part of FIG. 11(a)) in the arcing period can be controlled. It has been found through experiment that an optimum weld bead can be obtained at all times by providing a certain functional relation between the amount of charge Q in the arcing period and the wire feeding speed v.

Figure 12:
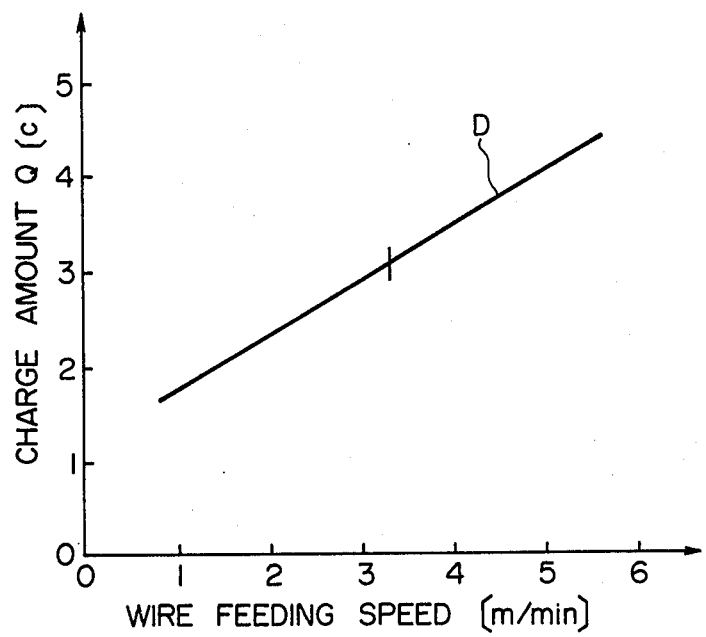
FIG. 12 is a characteristic diagram indicating the relation between the wire feeding speed and the amount of charge in the fourth embodiment.

FIG. 12 is a characteristic diagram indicating the relation between the wire feeding speed v and the amount of charge Q in an SP welding method in which a negative polarity is given to a wire electrode relative to the base metal. That is, in FIG. 12, the optimum weld beads are obtained on the characteristic curve D.

The amount of charge Q in the arcing period can be changed with respect to the wire feeding speed v in various manners; that is, the same effect can be obtained by changing the pulse width $\tau$ of the reference pulse current waveform $I_0$, the pulse peak current $I_P$, the pulse current period T or the DC current component (background current) $I_B$, in FIG. 11(b).

Figure 13:
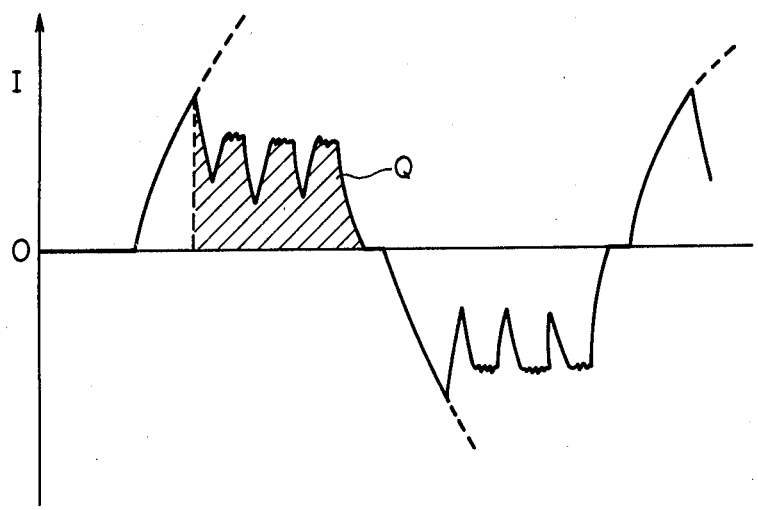
FIG. 13 is a waveform diagram showing the welding current of one modification of the fourth embodiment of the invention.

FIG. 13 is a diagram showing a current waveform of one example of a dual-polarity short circuit transfer arc welding machine to which the technical concept of the invention is applied. In this example also, the same effect may be obtained by controlling the amount of charge Q (shaded area) with respect to the wire feeding speed v.

In the fourth embodiment described above, the second comparator 17 is provided so that the reference pulse waveform generator is operated after production of arc. However, the same effect can be obtained by employing a method in which the comparator 17 is eliminated, and instead the reference pulse current $I_0$ is outputted according to the wire feeding speed at all times, so that when the wire electrode 7a is short-circuited with the base metal, the output of the first comparator 16 is placed in the "ON" state and the short circuiting current flows.

As is apparent from the above description, in the fourth embodiment of the invention, the amount of charge Q in the arcing period is automatically changed in a predetermined functional relation to the wire feeding speed, and therefore welding is automatically carried out under the optimum welding conditions at all times.

Figure 14:
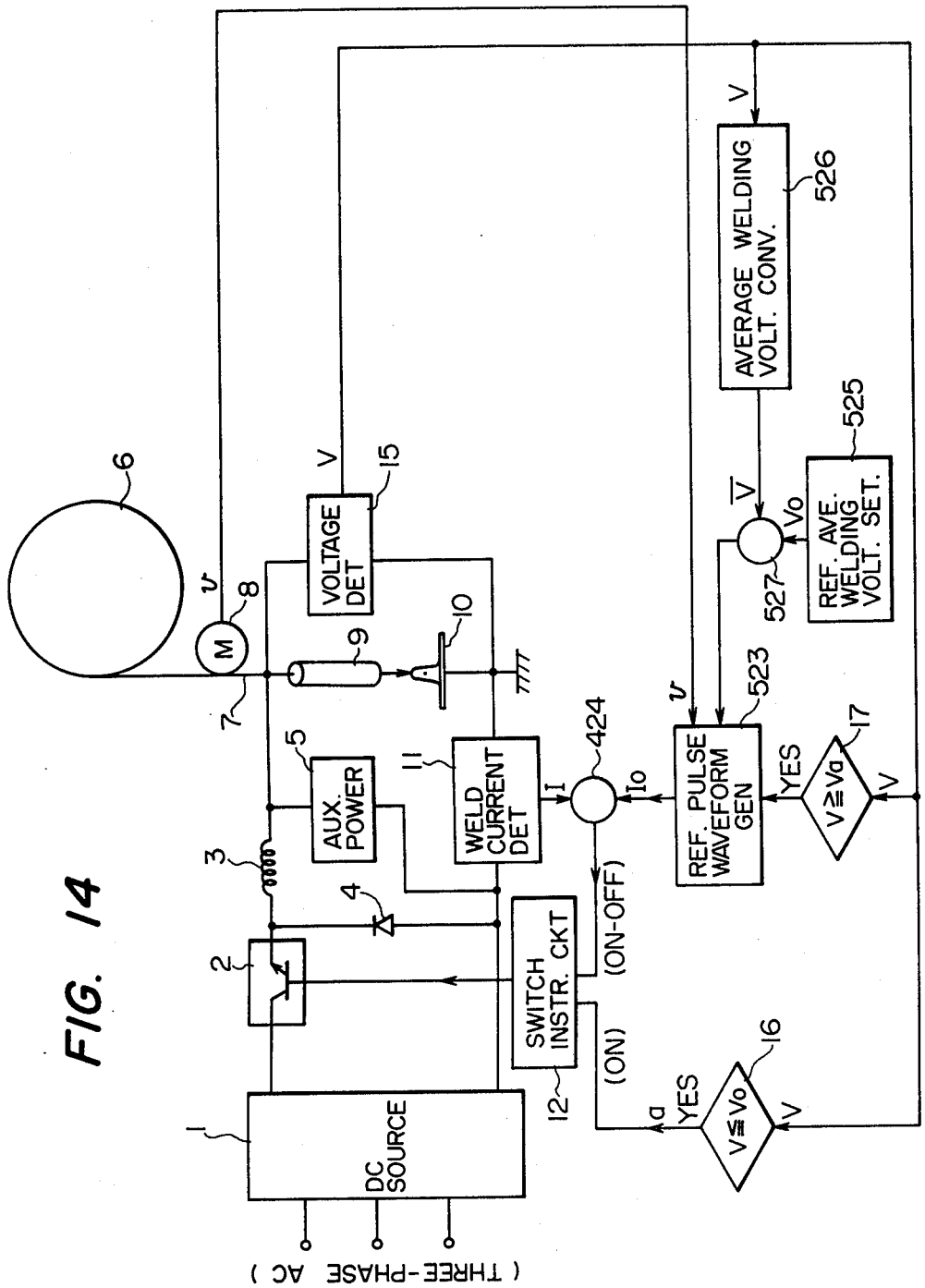
FIG. 14 is an explanatory diagram showing the arrangement of a fifth embodiment of the invention.

FIG. 14 shows a fifth embodiment of the invention which achieves the same object as the fourth embodiment of FIG. 10. In this embodiment, the variation of an average welding voltage is fed back to control the amount of charge in an arcing period, in order to eliminate the difficulty where when the distance between the wire electrode and the base metal is changed by vibration during welding, the repetitive period of short circuiting and arcing becomes irregular and the weld bead includes a defect such as an undercut.

In FIG. 14, reference numeral 11 designates a current detector; 523, a reference pulse waveform generator in which a reference pulse waveform $I_0$ is determined by wire feeding data and in which the operation time is controlled by a second comparator 17; 424, a comparator which compares the detection current value I of the current detector 11 with the reference pulse current waveform $I_0$, to apply an "ON-OFF" instruction signal to a switch instruction circuit 12 according to the comparison result; 525, a setting unit for setting a reference average welding voltage $V_o$, the voltage Vo being set by the operator according to the welding conditions, such as for instance the weld configuration: 526 an average welding voltage converter for converting the detection voltage V of a voltage detector 15 into an average welding voltage $\overline{V}$, to apply a signal for correcting the reference pulse current waveform $I_0$ of the reference pulse waveform generator 523 according to the difference voltage $(V_o - \overline{V})$. In FIGS. 10 and 14, like parts are designated by like reference numerals or characters.

Figure 15A:
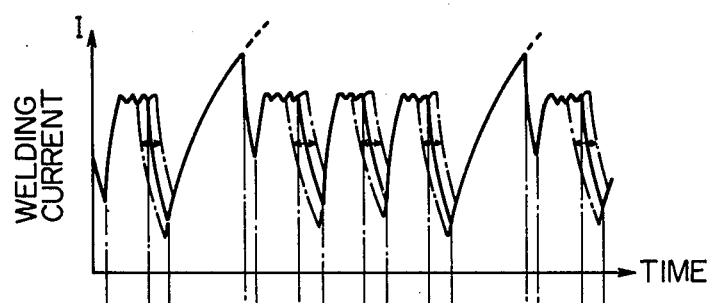
FIGS. 15(a), 15(b) and 15(c) are diagrams showing the welding current waveform, the reference pulse current waveform and the signal a of the fifth embodiment of the invention.
Figure 15B:
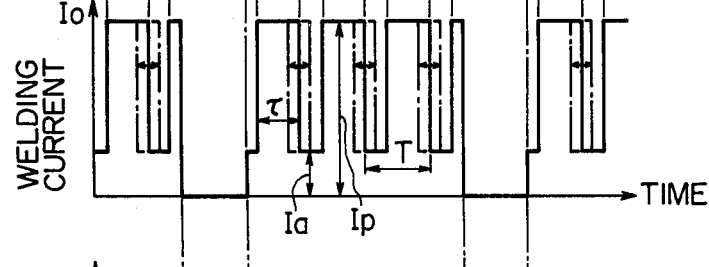
Figure 15C:
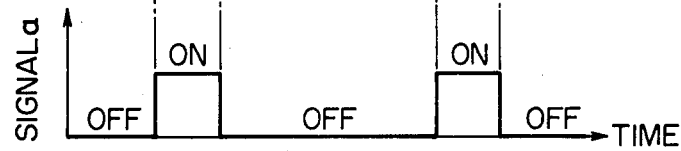

FIG. 15(a) is a diagram showing the waveform of a welding current I of the fourth embodiment, FIG. 15(b) is a waveform diagram showing the reference pulse current waveform $I_0$, and FIG. 15(c) is a time chart showing the output signal a of the first comparator 16.

The operation of the welding machine shown in FIG. 14 will now be described.

First, under the condition that the input switch (not shown) of the DC source circuit 1 is turned on, the end 7a of the wire electrode 7 is short-circuited with the base metal 10. In this case, the detection voltage V of the voltage detector 15 is lower than the voltage Vo corresponding to short circuiting $(V \leq Vo)$. Therefore, the first comparator 16 applies the "ON" instruction signal through the switch instruction circuit 12 to the switching element 2 to close the latter 2, and accordingly current flows from the DC source circuit 1. This current flows until the wire electrode 7 is burnt off and an arc is produced. Therefore, the detection voltage V of the voltage detector 15 is increased to the arc voltage from the short circuiting voltage, whereupon the operation of the first comparator 16 is suspended and the "OFF" instruction signal is applied to the switch instruction circuit 12. Soon the detection voltage V becomes higher than the voltage Va corresponding to arc reproduction $(V \geq Va)$ and therefore the second comparator 17 outputs a signal to operate the reference pulse waveform generator 523. At the same time, the reference pulse waveform generator 523 receives a wire feeding speed signal v from the wire feeding motor 8 and a waveform correction signal from the fourth comparator 527.

When the torch is caused to come below the set position by vibration or the like, since the preheating effect at the end of the wire electrode 7 is decreased, the wire electrode 7 may contact with the base material after arc production. As a result, the short circuiting period is decreased, the average welding voltage $\overline{V}$ of the detection voltage is decreased and further the arcing area is made narrower. Thus, the height of the weld bead is increased. When the torch is caused to move above the set position, since the preheat effect is increased, the wire electrode 7 may be melted after arc reproduction and short-circuiting hardly occurs. As a result, the short circuit period is increased, the average welding voltage V is increased and the arcing area is expanded. Thus, the height of the weld bead is decreased.

As the amount of charge Q in the arcing period is increased, the short circuiting period is increased. As the amount of change Q is decreased, the short circuiting period is decreased.

In the fourth embodiment 527, the average welding voltage $\overline{V}$ from the average welding voltage converter 526 is compared with the reference average welding voltage Vo. When the difference voltage $(Vo - \overline{V})$ is positive, the comparator 527 applies a signal for increasing the pulse width of the reference pulse current waveform, as seen in FIG. 15(b), to the reference pulse waveform generator 523. When the difference voltage is negative, the comparator 527 applies a signal for decreasing the pulse width to the reference pulse waveform generator 523. The reference pulse waveform generator 523 applies a waveform $I_0$ to the third comparator 424 which is obtained by correcting the width $\tau$ of the reference pulse waveform $I_0$ selected according to the wire feeding speed v. In the third comparator 424, the reference pulse current waveform $I_0$ is compared with the detection current value I of the current detector 11. When $I > I_0$, the third comparator 424 applies the "OFF" instruction to the switch instruction circuit 12. When $I < I_0$, the comparator 424 applies the "ON" instruction to the circuit 12. The switch instruction circuit 12, receiving the signal a from the first comparator 16 and the signal from the third comparator 424, applies the "ON-OFF" instruction signals as described above.

In the above-described welding machine, the amount of charge in the arcing period is changed according to the wire feeding speed v, and the width $\tau$ of the above-described current waveform is corrected so that the average welding voltage V becomes the preset reference average value. Therefore, even if the torch is vibrated vertically. Welding is carried out with the short circuiting period being constant at all times, and the effect attributed to the vibration or the like is eliminated.

As described above, during the arcing period, the wire electrode and the base metal are heated and molten, and the welding wire 7 is fed to the torch 9 by the wire feeding motor 8. The end 7a of the wire electrode 7 is short-circuited with the base metal 10, whereupon the first comparator 16 is operated so that the "ON" instruction is applied to the switch instruction circuit 12. Thus, the switching element 2 is closed until the next arc reproduction, so that the supply of the current is effected and transfer of the molten wire electrode to the base metal is achieved.

In the above-described embodiment, the amount of charge Q in the arcing period is corrected with the aid of the pulse width $\tau$ of the reference pulse current waveform. However, the same effect may be obtained, as noted previously, by correcting at least one of the pulse width of the reference pulse current waveform, peak current $I_p$ and pulse period T, or the background current $I_B$.

What is claimed is:

1. A short circuit transfer arc welding machine, comprising:
   a wire electrode which is fed towards a base metal;

a DC source for applying a voltage across said base metal and said wire electrode;

a switching circuit for interrupting said voltage;

a voltage detector for detecting a voltage developed across said base metal and said wire electrode;

a first comparator for determining when a detection voltage of said voltage detector reaches a voltage value corresponding to the short circuiting of said base metal and wire electrode;

a second comparator for determining when said detection voltage of said voltage detector reaches an arc discharge voltage;

switching circuit control means for closing said switching circuit in response to a signal from said first comparator and opening said switching circuit in response to a signal from said second comparator; and a polarity change-over mechanism for inverting, at a predetermined rate, the polarity of a DC voltage which is applied between said wire electrode and base metal from said DC source.

2. A machine as claimed in claim 1, said polarity change-over mechanism comprising means for controlling, according to an amount of penetration of a wire electrode or an amount of reinforcement of a weld bead, the rate at which the polarity of said wire electrode becomes positive or negative with respect to said base metal.

3. A machine as claimed in claim 2, in which said polarity change-over mechanism sets, as a time rate, the rate at which the polarity of said wire electrode becomes positive or negative with respect to said base metal.

4. A machine as claimed in claim 2, in which said polarity change-over mechanism sets, using the number of instances of short-circuiting of said wire electrode and base metal, the rate at which the polarity of said wire electrode becomes positive or negative with respect to said base metal.

5. A machine as claimed in claim 4, in which said number of short-circuiting instances is counted by a counter adapted to count a signal from said first comparator.

6. A machine as claimed in claim 2, in which said polarity change-over mechanism sets, using an amount of charge in an arcing period, the rate at which the polarity of said wire electrode becomes positive or negative with respect to said base metal.

7. A machine as claimed in claim 2, in which said switching circuit comprises an inverter circuit for varying the pulse width and polarity of a welding current.

8. A machine as claimed in claim 7, in which said inverter circuit comprises a plurality of power transistors, and is actuated by control means.

9. A machine as claimed in claim 8, in which said control means receives a signal from said polarity change-over mechanism, to actuate said inverter.

10. An apparatus as claimed in claim 1, wherein polarity change-over is carried out in synchronization with the short-circuiting of said base metal and said wire electrode.

11. A short circuit transfer arc welding machine, comprising:

a wire electrode which is fed towards a base metal;

a DC source for applying a voltage across said base metal and said wire electrode;

an inverter circuit for controlling a welding current supplied between said base metal and wire electrode so that the pulse width and polarity thereof are varied;

a voltage detector for detecting a voltage developed across said base metal and said wire electrode;

a first comparator for determining when a detection voltage of said voltage detector reaches a voltage value corresponding to the short-circuiting of said base metal and wire electrode;

a second comparator for determining when said detection voltage of said voltage detector reaches an arc discharge voltage;

a welding current detector for detecting a welding current;

means for setting a reference pulse current waveform according to an arc length and a wire feeding speed, which are preset;

means for setting a ratio of the application of welding current in a forward polarity to the application of welding current in a reverse polarity; and control means for beginning application of a welding current in response to a signal from said first comparator and for suspending application of said welding current in response to a signal from said second comparator, said control means operating to compare a welding current detected by said welding current detector with said reference pulse current waveform so that the former and the latter are coincided with each other, and to control said inverter circuit and said ratio.

12. A machine as claimed in claim 11, including correcting means for setting said reference pulse current waveform according to a wire electrode feeding space and for decreasing or increasing the pulse width of said reference pulse curent waveform, respectively, when an average output voltage value of said voltage detector is increased or decreased.

13. A machine as claimed in claim 12, in which said arc length and said wire feeding speed are set by operator controls.

14. A short circuit transfer arc welding machine comprising:

a wire electrode which is fed towards a base metal;

a DC source for applying a voltage across said base metal and wire electrode;

a switching circuit for interrupting said voltage;

a voltage detector for detecting a voltage developed across said base metal and wire electrode;

a first comparator for determining when a detection voltage of said voltage detector reaches a voltage value corresponding to the short-circuiting of said base metal and wire electrode;

a second comparator for determining when said detection voltage of said voltage detector reaches an arc discharge voltage;

a reference pulse waveform generator for generating a reference pulse current waveform according to both a detected wire feeding speed and a signal from said second comparator;

a welding current detector for detecting a welding current;

a third comparator for comparing a current value detected by said welding current detector with said reference pulse current, to provide a control signal; and control means for controlling the opening and closing of said switching circuit in response to said control signal and the output of said first comparator.

15. A machine as claimed in claim 14, including an auxiliary power source for supplying a DC current for maintaining a welding arc between said base metal and wire electrode.

16. A machine as claimed in claim 15, in which an arc discharge current between said wire electrode and a material to be welded is obtained by superposing a pulse current from said DC source on a background current ($I_B$) from said auxiliary power source, and said reference pulse current waveform is controlled by adjusting at least one of said background current ($I_B$) and the period (T), pulse width ($\tau$) and peak value ($I_P$) of said pulse current.

17. A machine as claimed in claim 14, further comprising a wire feeding motor, a rotational speed of said wire feeding motor comprising said wire feeding speed.

18. A short circuit transfer arc welding machine comprising:

a wire electrode which is fed towards a base metal;

a DC source for applying a voltage between said base metal and wire electrode;

a switching circuit for interrupting a voltage developed across said base metal and wire electrode;

a first comparator for determining when a detection voltage of said voltage detector reaches a voltage value corresponding to the short-circuiting of said base metal and wire electrode;

a second comparator for determining when said detection voltage of said voltage detector reaches an arc discharge voltage;

an average voltage converter for converting said detection voltage of said voltage detector into an average voltage;

a fourth comparator for comparing a preset average welding voltage with a signal from said average voltage converter, to provide a first control signal;

a reference pulse waveform generator connected to outputs of said second and fourth comparators for generating a reference pulse current waveform according to at least said second and fourth comparator outputs;

a welding current detector for detecting a welding current;

a third comparator for comparing a current value detected by said welding current detector with said reference pulse current, to provide a second control signal; and control means for controlling the operation and closing of said switching circuit according to an output signal from said first comparator and said second control signal.

19. A machine as claimed in claim 18, including an auxiliary power source for supplying a DC current for maintaining a welding arc between said base metal and wire electrode.

20. A machine as claimed in claim 19, in which an arc discharge current between said wire electrode and a material to be welded is obtained by superposing a pulse current from said DC source on a background current ($I_B$) from said auxiliary power source, and said reference pulse current waveform is controlled by adjusting at least one of said background current ($I_B$) and the period (T), pulse width ($\tau$) and peak value ($I_P$) of said pulse current.

* * * * *